United States Patent
Langlotz

(12) 
(10) Patent No.: US 11,283,989 B1
(45) Date of Patent: Mar. 22, 2022

(54) DIGITAL CAMERA WITH MULTI-SUBJECT FOCUSING

(71) Applicant: Bennet Langlotz, Dallas, TX (US)

(72) Inventor: Bennet Langlotz, Dallas, TX (US)

(*) Notice: Subject to any disclaimer, the term of this patent is extended or adjusted under 35 U.S.C. 154(b) by 0 days.

(21) Appl. No.: 17/345,677

(22) Filed: Jun. 11, 2021

(51) Int. Cl.
*H04N 5/232* (2006.01)

(52) U.S. Cl.
CPC ... *H04N 5/232127* (2018.08); *H04N 5/23219* (2013.01); *H04N 5/23248* (2013.01)

(58) Field of Classification Search
CPC ......... H04N 5/232127; H04N 5/23219; H04N 5/23248
USPC .................................................... 348/208.99
See application file for complete search history.

(56) References Cited

U.S. PATENT DOCUMENTS

| | | | | |
|---|---|---|---|---|
| 7,463,296 | B2* | 12/2008 | Sun | G06T 5/50 348/254 |
| 8,849,064 | B2* | 9/2014 | Mocanu | H04N 5/23218 382/284 |
| 9,294,678 | B2* | 3/2016 | Takahashi | H04N 5/232127 |
| 9,386,213 | B2* | 7/2016 | Matsumoto | H04N 5/23232 |
| 9,386,215 | B2* | 7/2016 | Ono | G03B 13/36 |
| 9,531,938 | B2* | 12/2016 | Ogura | H04N 5/232125 |
| 10,375,292 | B2* | 8/2019 | Park | G02B 3/0006 |
| 10,917,571 | B2* | 2/2021 | Shanmugam | G06K 9/00671 |
| 11,212,489 | B2* | 12/2021 | Yoshimura | B60R 11/02 |
| 2012/0120269 | A1* | 5/2012 | Capata | G06K 9/6257 348/222.1 |
| 2012/0281132 | A1* | 11/2012 | Ogura | H04N 5/232123 348/348 |
| 2014/0192216 | A1* | 7/2014 | Matsumoto | H04N 5/23218 348/222.1 |
| 2014/0226914 | A1* | 8/2014 | Mocanu | H04N 5/23232 382/255 |
| 2014/0285649 | A1* | 9/2014 | Saitou | H04N 5/23238 348/77 |
| 2015/0055007 | A1* | 2/2015 | Takahashi | H04N 5/23293 348/333.11 |
| 2015/0195449 | A1* | 7/2015 | Ono | G01B 11/14 348/349 |
| 2016/0021293 | A1* | 1/2016 | Jensen | G06K 9/00677 348/349 |
| 2018/0063409 | A1* | 3/2018 | Rivard | H04N 5/23212 |
| 2018/0131869 | A1* | 5/2018 | Kim | H04N 5/232127 |
| 2018/0213144 | A1* | 7/2018 | Kim | G06F 3/016 |
| 2019/0215440 | A1* | 7/2019 | Rivard | H04N 5/232127 |
| 2019/0243376 | A1* | 8/2019 | Davis | H04N 5/247 |
| 2020/0145583 | A1* | 5/2020 | Shanmugam | H04N 5/23229 |
| 2021/0149274 | A1* | 5/2021 | Kang | H04N 5/232933 |

\* cited by examiner

*Primary Examiner* — Pritham D Prabhakher
(74) *Attorney, Agent, or Firm* — Bennet K. Langlotz; Langlotz Patent & Trademark Works, LLC

(57) ABSTRACT

A camera system comprising a body that contains a lens with a range of focus settings and an image sensor operable to record an image. The camera system has a controller operably connected to the sensor to receive the image, and the controller is operably connected to the lens to control the focus setting. The controller is operable to focus the lens on a selected point, and the controller is operable to determine at least two different first and second subject elements. The controller is operable to focus the lens on the first subject and record a first image, and the controller is operable to focus the lens on the second subject and record a second image.

21 Claims, 4 Drawing Sheets

DIGITAL CAMERA WITH MULTI-SUBJECT FOCUSING

FIELD OF THE INVENTION

This invention relates to digital cameras, and to enhancing auto focusing performance and image processing.

BACKGROUND OF THE INVENTION

Cameras and other imaging devices normally have a single plane of focus, with a range of acceptable focus ("depth of field") near that range. Large apertures are useful for low light imaging, but create a narrower focal range. This means that it is impossible in some circumstances to generate sharp images of multiple subjects at different focal distances without the aid of external lighting, narrower apertures, and other measures that can affect desired images.

Modern digital cameras may employ a capability called "focus stacking" in which a fixed camera images a stationary inanimate subject (such as for product photography) and takes a series of many images at regular focal distance intervals. Each image is at an incrementally different focal distance to cover the range of distances from the closest to the farthest point of the subject, with the distances being selected for even spacing in the range, without regard to the elements of the subject or their distance. The image distance intervals are narrow enough to ensure that the intervals are less that the depth of focus of each image to that all subject points are in focus for at least one of the images. The images are then post-processed into a single image that uses the sharpest image segment for each area on the subject to generate an overall sharp image.

While effective for stationary subjects this is not useful for moving subjects like people. Even a person sitting relatively still for a portrait may move enough to generate misalignment of the images. Moreover, the number of images required can be in the dozens or even hundreds to cover large subjects, requiring extended periods when motionlessness is required. For example, even a fast 20 frames per second shutter with a limited 20-frame image will require one second of motionlessness, which is beyond the capacity for hand-holding, subject motion, and image stabilization. Moreover, the appearance of having all points of a subject in focus is unnatural and may be undesirable in instances when only selected elements (at different focal distances) are desired to be in focus. For example, a sharp image of each person in a small group (or of all facial features of a model) while the background is blurred to eliminate distractions.

Accordingly, there is a need for a camera system comprising a body that contains a lens with a range of focus settings and an image sensor operable to record an image. The camera system has a controller operably connected to the sensor to receive the image, and the controller is operably connected to the lens to control the focus setting. The controller is operable to focus the lens on a selected point, and the controller is operable to determine at least two different first and second subject elements. The controller is operable to focus the lens on the first subject and record a first image, and the controller is operable to focus the lens on the second subject and record a second image.

DETAILED DESCRIPTION OF A PREFERRED EMBODIMENT

Figure 1:
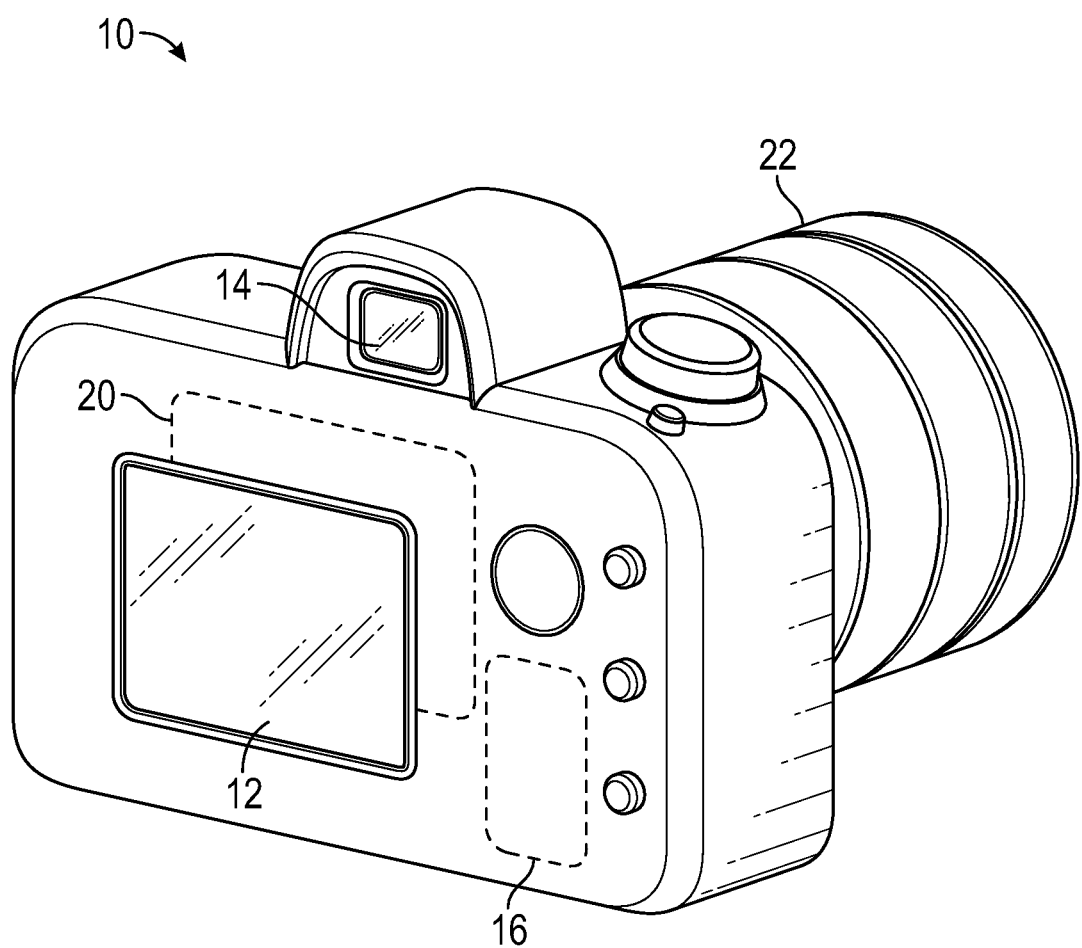
FIG. 1 shows a camera according to a preferred embodiment of the invention.

FIG. 1 shows a digital camera 10 with an electronic display screen 12 and viewfinder screen 14. The camera includes an internal controller 16 connected to an image sensor 20 and operable to display the sensor image on both screens. It also interfaces with the camera lens 22 to control autofocus, and may generate indicators of focus points on the screen. The camera may detect faces and eyes in the image, and these may be preferred auto-focus points.

Figure 2:
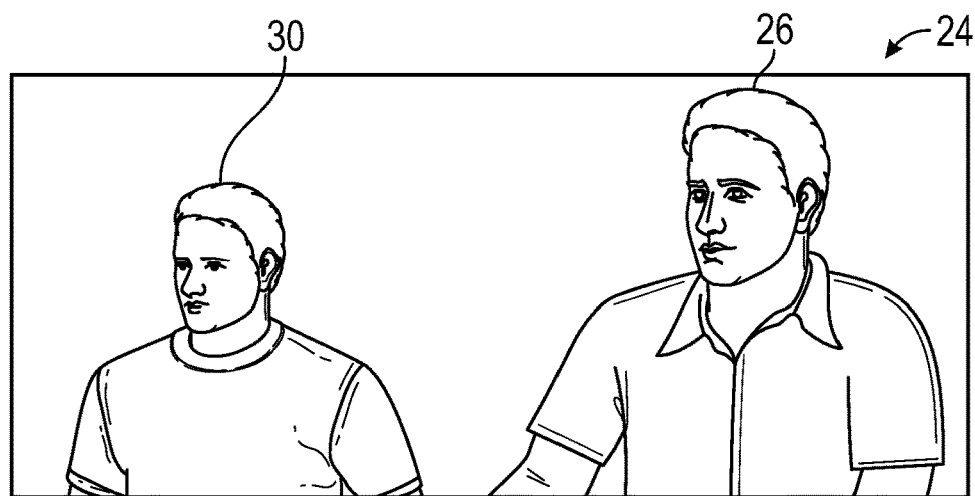
FIGS. 2-10 show exemplary images as recorded by the preferred embodiment.

The system operates to image a scene 24 shown in FIG. 2. The scene has at least two subjects 26 in the foreground, and 30 at a greater distance from the camera, in the background. In this example the subject are two people, each with a visible face. The controller analyzes an initial image generated by the sensor to determine the image content, and to identify and locates subjects of potential interest, such as by using known algorithms for face detection eye detection, and presumed priority of subjects.

Figure 3:
Figure 4:
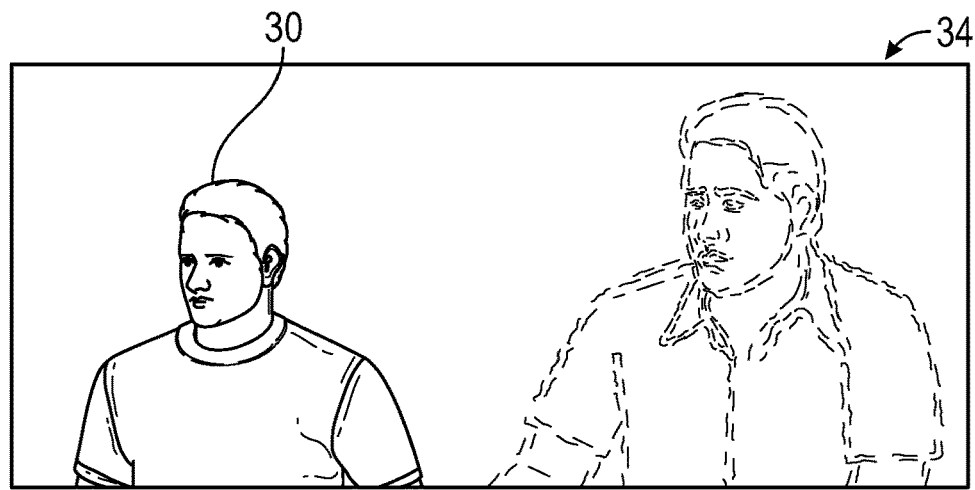
Figure 5:
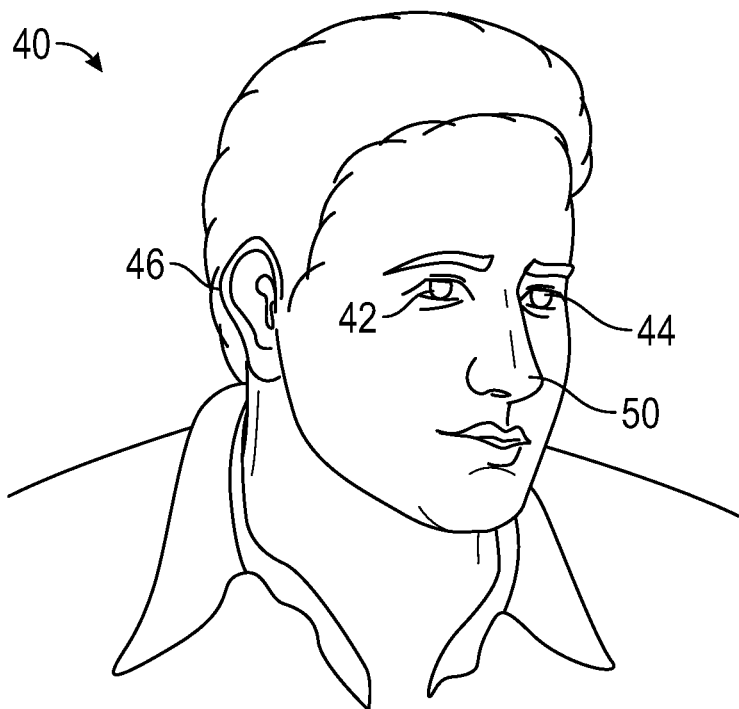

When the two subjects are at different focal distances such as is illustrated, the camera operates to take two images in rapid succession. FIG. 3 shows a first image 32 with subject 26 in focus, and FIG. 4 shows second image 34 the other subject 30 in focus. The images may be captured as rapidly as possible at the camera's fastest frame rate, which may be 10 or 20 or 30 frames per second, or other values depending on the user's selection and advancing technology. Preferably the frame rate is at least 5 FPS, and more preferably 10 FPS or more to generate imaging in an interval during which subject movement and camera shake after stabilization is acceptable The sequence of captured images may simply be stored, for (in one basic usage) the user later to select which is the desired single subjects in an otherwise normally focused image. This avoids the need for the photographer to select from among subjects during the imaging event. An example might include a sideline image of a football line of scrimmage, with a rapid sequence of each of the linemen being imaged in focus. Notably for all embodiments, the system does not simply take a sequence of images at limited intervals irrespective of the subjects' actual locations in hope of getting everything approximately in focus. It operates to select image focal distances based on the location of actual subjects, and operates preferably to focus specifically on selected and identified subjects, with only that many images captured, and each subject optimally in focus. Even two subjects at very different focal distances will have images captured rapidly in sequence without intervening images to create an undesired delay in capturing the two (or more) most critical subjects.

In more advanced embodiments, the image is processed and composited using the techniques associated with conventional focus stacking or bracketing to create a single image with both (or all) subjects in focus. In a simple example, the sharply focused face is overlaid on the same subject's blurry face of the other image, in the sense of photoshopping a face in a group image to eliminate an eye blink. In the simple example, the face may be positioned in the same location on the frame, with the assumption that the brief interval between shots does not cause an objectionable offset.

In a more advanced system, the blurred image of the subject is analyzed to establish location datum points, and these are correlated with location datum points in the sharply focused face image, so that the sharp face is pasted onto the main image in registration with the face (or any subject) of the reference image. For instance, the blurry eyes of the left subject in FIG. 3 could be located to estimate a registration point to align the sharp eyes of the same subject from FIG. 4. The sharp face can then be overlaid, not necessarily only based on the same pixel-for-pixel location if there was no camera shake or subject motion, but to reregister the sharp image even if the subject moved relative to the right foreground subject or relative to the background.

More than just the face or other key element of the second image may be composited with the first image. While the boundary of the face may be identified and pasted onto the other image, more advanced approaches may be employed. As with focus bracketing systems, each location may be assessed to determine which of the two or more images is in closer focus to represent that location more sharply. This will ensure smooth transitions where each image is about equally out of focus (or sharp) at a transition between images. And as with location of the sharp element in registration with the location of the blurred image of the same element, the transition areas may be stretched and shafted to ensure that there is registration potentially at many different points along a perimeter between images.

Foreground and background blur control may be employed. In the illustrated case of the nearer and farther subjects of FIGS. 2-4, one option as discussed above is to use one frame as the master, and pasting only limited critical elements of the second frame. An alternative to this is to use images elements based on which image they are sharper in. The nearer subject would be captures along with foreground subjects and other subjects closer to the camera than a midpoint between subjects that are rendered equally sharp in either image. The background and beyond-midpoint subjects would be taken from the image in which the background subject is sharp. A third option is to do the reverse, and to use the blurrier background from the image focused on the nearer subject to provide an often desired, and the blurrier foreground (if any) from the image focused on the farther subject. This provides a sometimes-desired greater blur of non-subject elements. A basic version toward this result where only background is a concern is to bias toward using the foreground subject image as the master image to get the blurriest background, and compositing in only the rear subject as needed. In any embodiment, these alternatives can be all tested in post processing and the user (or expert system) given the choice between the different looks provided, and to avoid any approaches that introduce unwanted artifacts be rejected in favor of better results.

Figure 6:
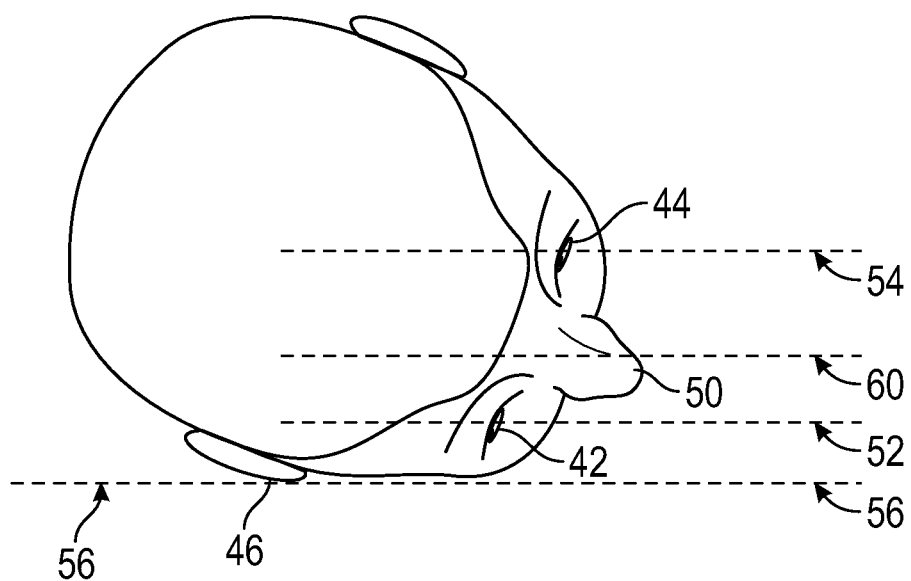

An additional implementation for a person's face 40 is depicted in FIGS. 5-10. Here, the subjects are selected points of interest on a single person depicted. In the simplest example, each of the person's two eyes are the subjects desired to be in focus. As illustrated, the person has a near eye 42, far eye 44, near ear 46, and nose 50, each at different focal distances from the camera recording the depicted image. FIG. 6 shows the focal planes. Near eye focal plane 52, far eye focal plane 54, near ear focal plane 56, and nose focal plane 60.

Figure 7:
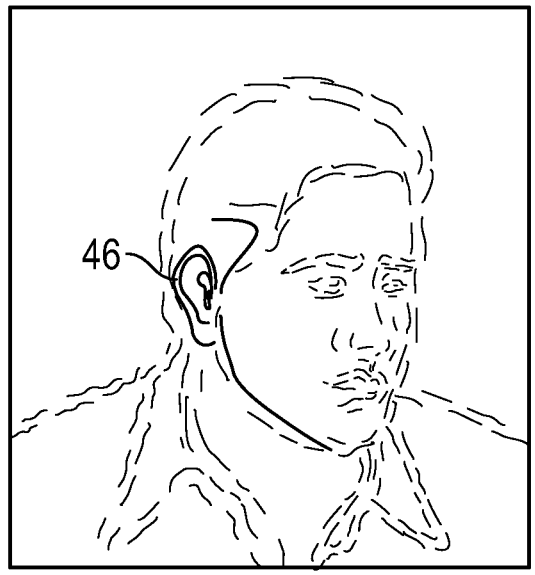
Figure 8:
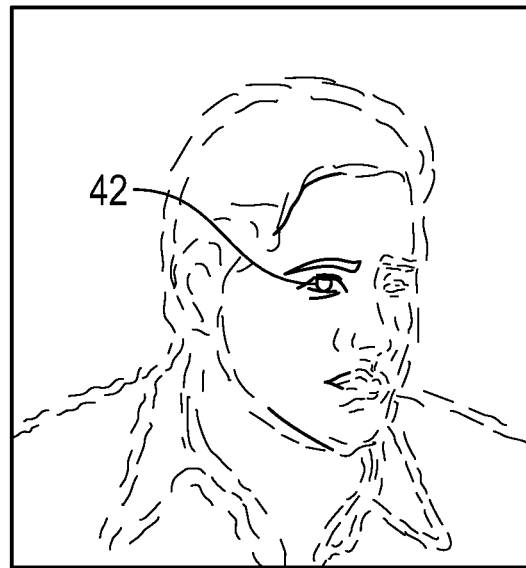
Figure 9:
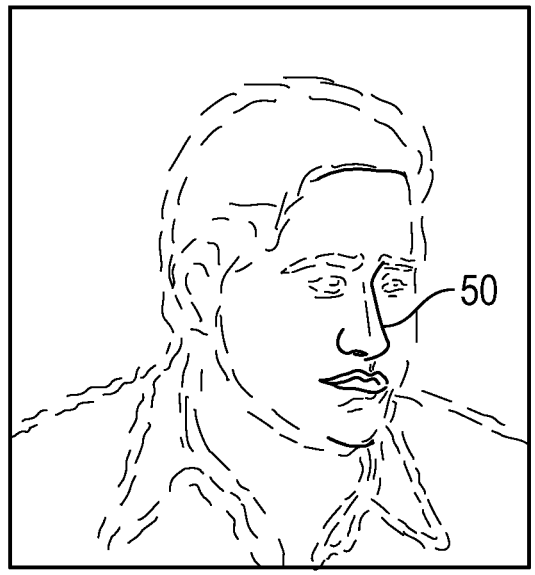
Figure 10:
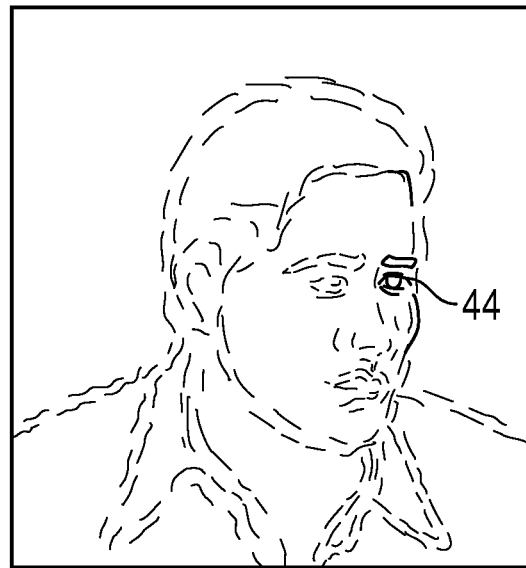

FIG. 7 depicts the image with the near ear 46 in focus.
FIG. 8 depicts the image with the near eye 42 in focus.
FIG. 9 depicts the image with the nose 50 in focus.
FIG. 10 depicts the image with the far eye in focus.

The system may be programmed to recognize any of these specific elements, and to shoot images in rapid succession, with each in focus, changing focus between images. As above, the images may be composited in the manner of focus stacking systems, or the sharp selected features may be composited into a selected master image.

In an alternative embodiment, the nearest and farthest desired subjects may be identified, and the camera operated to automatically shoot a number of evenly spaced images at focal distances between the selected subjects, creating an effective depth of field. The intervals may be evenly spaced, and may be based on an analysis by the processor or controller of whether the selected subjects are at far apart enough focal distances to necessitate one of more intermediate images to generate sharp images (such as the nose of a subject when focusing primarily on a near and far eye). Also, if the subjects are separated (as with two people in foreground and background) how many images are required between the two selected focal distance extremes. This may also determine whether other subjects are in view in the middle distance between the two primary subjects. Because the intermediate subject matter may be of lesser importance, the camera may first image the two or more primary subjects detected and identified as important, then capture the intermediate focal distance images that are less problematic if lost due to subject movement of camera shake.

Conventional focus stacking may be improved (made faster and potentially hand-holdable) by employing similar principles by using a detected subject such as a face or eye at the starting point, and optionally a second detected subject as an end point, using appropriate intervals as determined by automatic image analysis (e.g. more images at tighter intervals for large aperture fast lens settings with thin depth of focus, fewer for smaller aperture slow lens settings). FIG. 6 shows four focal distances with uneven spacing, but some systems may simply use the extreme (nearest and farthest) subjects and have the intermediate distance subjects imaged not by their detection and focus at their distance, but approximated by even intervals or other intervals based on other factors. Note that even intervals may be considered "even" in the sense of actual distances, but are more likely calculated as a function of distance that may be geometric or exponential, and based on tolerated defocus degree. This improved focus stacking may also employ a manual user-established selection of subjects, simply by the user manually focusing the lens on the close focus distance desired and indicating the selection (the nearest point on the subject, possibly a product being photographed, or a studio portrait subject's nose tip), and then focusing to the far limit of desired focus and indicating that selection. Even ordinary focus stacking systems without one of more end point focal distances based on detected or selected subjects may help the user by suggesting interval spacing based on camera-calculated depth of focus for a tolerable level of focus on all intermediate points. For instance, a 100 mm lens at f2.8 for a subject ranging from 2 feet to three feet would be calculated to require, say, 10 images, so that the user needn't guess a time consuming and memory-clogging excessive number, nor a needlessly skimpy limited number leaving some less than desirable focus areas.

The image processing may be in camera or post processing, and may be done interactively with the user who may select from the recorded images.

The invention claimed is:
1. A camera system comprising:
 a body;
 a lens with a range of focus settings;
 an image sensor operable to record an image;
 a controller operably connected to the sensor to receive the image;

the controller operably connected to the lens to control the focus setting;

the controller operable to focus the lens on a selected point;

the controller operable to determine at least two different first and second subject elements;

the controller operable to focus the lens on the first subject and record a first image depicting the first subject and the second subject;

the controller operable to focus the lens on the second subject and record a second image depicting the first subject and the second subject;

the first image depicting the first subject more sharply than in the second image and the second image depicting the second subject more sharply than in the first image; and a processor operable to generate a composite image including the first subject from the first image and second subject from the second image.

2. The camera system of claim 1 wherein determining at least two different subject elements includes recognizing two different faces.

3. The camera system of claim 1 wherein determining at least two different subject elements includes recognizing two different eyes of an individual.

4. The camera system of claim 1 wherein the camera is operable to record the second image immediately after recording the first image.

5. The camera system of claim 1 wherein the number of images is based on the number of subjects.

6. The camera system of claim 1 wherein the controller is operable to record only two images in sequence.

7. The camera system of claim 1 including an image stabilization system operable to maintain a stable image on the sensor while recording the first and second image.

8. The camera of claim 1 wherein the controller is operable to record a third image at an intermediate focus setting between the focus settings on the first and second subjects.

9. A camera system comprising:

a body;

a lens with a range of focus settings an image sensor operable to record an image;

the controller operably connected to the sensor to receive the image;

the controller operably connected to the lens to control the focus setting;

the controller operable to focus the lens on a selected point;

the controller operable to determine at least two different first and second subject elements;

the controller operable to focus the lens on the first subject and record a first image;

the controller operable to focus the lens on the second subject and record a second image, and a processor operable to substitute a second image segment from the second image associated with the second subject for a second image segment of the first image associated with the second subject.

10. The camera system of claim 9 wherein the second image segment from the first image depicts an out of focus eye and the second image segment from the second image is a sharper depiction of the same eye.

11. The camera system of claim 9 wherein the second image segment from the first image depicts an out of focus face and the second image segment from the second image depicts a sharper depiction of the same face.

12. The camera system of claim 9 wherein the processor is operable to establish a location of second subject based on first image, and to locate the second image segment from the second image based on the established location.

13. A method of operating a camera system to generate an image of multiple subjects at different focal distances, the method comprising:

providing an autofocus camera operable to focus an image on a sensor and identify selected subjects in the image;

generating an image on the sensor;

identifying at least first and second subject elements in the image;

focusing a lens on the first subject and recording a first image depicting the first subject and the second subject; and after recording the first image, focusing the lens on the second subject and recording a second image depicting the first subject and the second subject, the first image depicting the first subject more sharply than in the second image and the second image depicting the second subject more sharply than in the first image.

14. The method of claim 13 wherein the at least two different subject elements are two different faces.

15. The method of claim 13 wherein the at least two different subject elements are two different eyes of an individual.

16. The method of claim 13 including record the second image immediately after recording the first image.

17. The method of claim 13 wherein the number of images recorded is based on the number of subjects.

18. The method of claim 13 including recording only two images for a single depression of a shutter actuator on the camera.

19. The method of claim 13 including processing the recorded images to substitute second image segment from the second image associated with the second subject for a second image segment of the first image associated with the second subject.

20. The method of claim 19 including establishing a location of second subject based on first image, and locating the second image segment from the second image based on the established location.

21. The method of claim 13 wherein the camera has a fastest frame rate and recording the first and second images occurs at the fastest frame rate.

\* \* \* \* \*